United States Patent [19]

Matero

[11] Patent Number: 5,898,406
[45] Date of Patent: Apr. 27, 1999

[54] ANTENNA MOUNTED DIPLEXER

[75] Inventor: Jorma Matero, Oulu, Finland

[73] Assignee: Nokia Mobile Phones Limited, Salo, Finland

[21] Appl. No.: 08/816,694

[22] Filed: Mar. 13, 1997

[51] Int. Cl.$^6$ ............................................. H01Q 1/24
[52] U.S. Cl. ........................ 343/702; 343/900; 455/89
[58] Field of Search ............................ 343/702, 900, 343/715, 850, 857; 455/89, 90, 73; 333/202, 204, 206; H01Q 1/24

[56] References Cited

U.S. PATENT DOCUMENTS

| | | | |
|---|---|---|---|
| 4,128,840 | 12/1978 | Tucker | 343/715 |
| 4,998,078 | 3/1991 | Hulkko | 333/109 |
| 5,341,149 | 8/1994 | Valimaa et al. | 343/895 |
| 5,561,439 | 10/1996 | Moilanen | 343/846 |
| 5,627,550 | 5/1997 | Sanad | 343/700 MS |
| 5,668,564 | 9/1997 | Seward et al. | 343/791 |

*Primary Examiner*—Hoanganh Le
*Attorney, Agent, or Firm*—Perman & Green, LLP

[57] ABSTRACT

A diplexer for coupling plural electronic circuits to a common antenna, wherein the antenna has at least a portion which is in the shape of a rod. The diplexer includes a set of dielectric sleeves encircling the rod-shaped portion of the antenna. The diplexer is constructed of plural branches, each of which has a filter for passing signals in a portion of the spectrum different from the portions of the spectra passed by other ones of the branches. Inductors and capacitors employed in respective ones of the branches are formed by electrical elements disposed on surfaces of the sleeves. Such elements include bands of electrically conductive material which serve as plates of capacitors, and elongated conductive strips which serve as inductors. Resistive material may also be placed on surfaces of the sleeves for construction of resistors of the branches in the event that such resistors are required in the electrical filtering. In the case of a portable electronic component, such as a radiotelephone having a housing with an antenna extending therefrom, the construction of the diplexer provides for a compact configuration enabling use of the diplexer without enlargement of the housing and without inconvenience to a user of the radiotelephone.

12 Claims, 4 Drawing Sheets

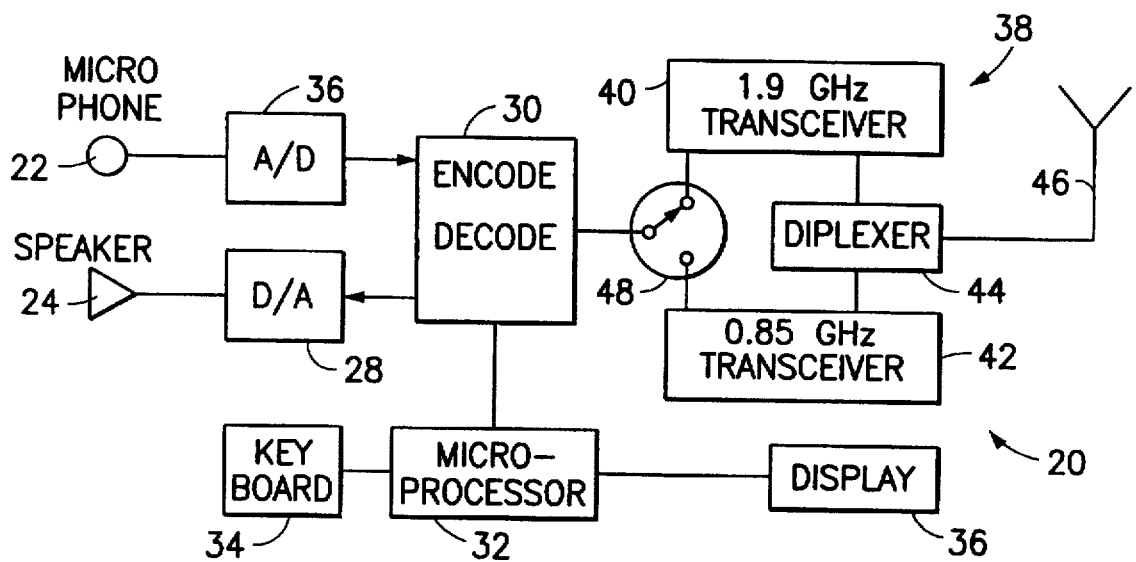
FIG. 1
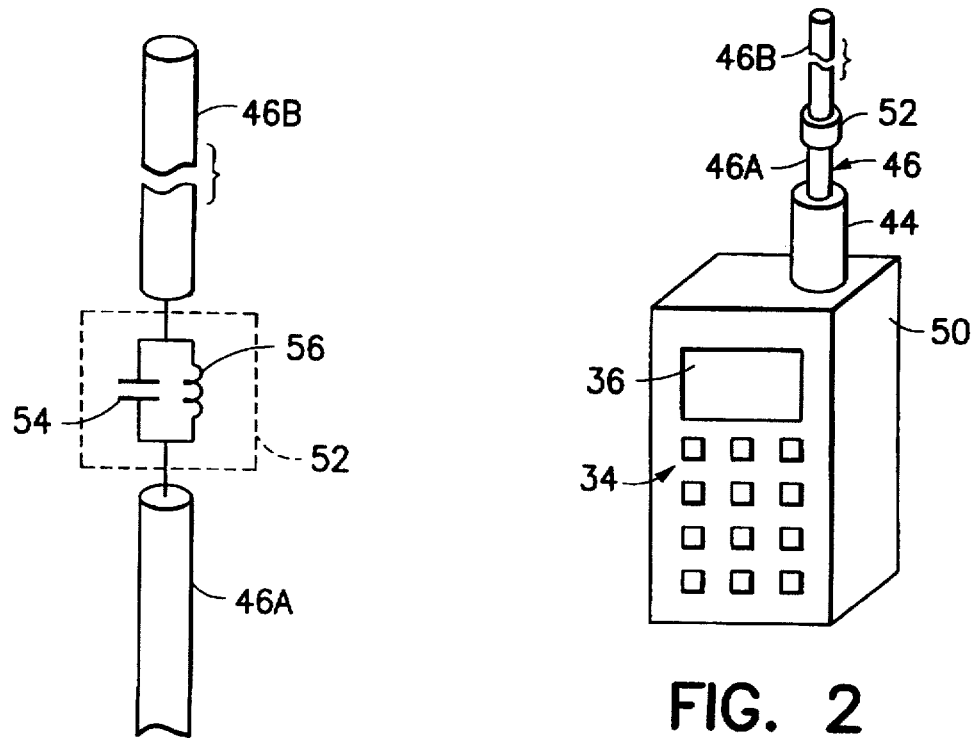
FIG. 3
FIG. 2

ANTENNA MOUNTED DIPLEXER

FIELD OF THE INVENTION

This invention relates to diplexers suitable for use with portable telephony equipment including dual band radiotelephones and, more particularly, to a diplexer constructed for mounting on the stalk of an antenna, such as the rod-shaped antenna of a radiotelephone.

BACKGROUND OF THE INVENTION

It is desirable to manufacture a radiotelephone having two transceivers which are operative respectively in, by example, the 1900 MHz and 850 MHz frequency bands. By example, the 1900 MHz band may be used for TDMA (digital) communications, such as that specified by IS-136 or DCS1900 MHz of PCS, while the 850 MHz band may be used for analog (e.g., AMPS) communications. Such a radiotelephone requires a diplexer for separating RF (radio frequency) signals at the 1900 MHz and 850 MHz bands. The diplexer connects the antenna, typically in the form of a rod, with the two transceivers in the radiotelephone, one transceiver being operative at 1900 MHz and the other transceiver being operative at 850 MHz.

The addition to the radiotelephone of a further electrical component, such as a diplexer having a conventional configuration, may necessitate an increase in the physical size of the radiotelephone. This would create a problem in that it is generally desirable to decrease, rather than to increase the size of the radiotelephone. Thus, there is a need to fabricate the diplexer in a manner which avoids excessive increase in the size of the radiotelephone.

SUMMARY OF THE INVENTION

The aforementioned problem is overcome and other advantages are provided by a diplexer which is suitable for use in portable electronic equipment such as a radiotelephone. In accordance with the invention, the diplexer has a construction which minimizes any increase in the size of the radiotelephone. The construction of the diplexer employs a portion of the rod-shaped antenna external to the housing of the radiotelephone, thereby to permit the housing to be retained without enlargement of its overall dimensions.

The portion of the rod-shaped antenna employed by the invention is the portion contiguous the housing, this portion being in the form of a stalk which holds the antenna to the housing. The invention can be constructed with an antenna of shape other than the rod, such as a helix or other form of antenna having a stalk by which the antenna can be mounted to the housing. By fabricating the diplexer around the antenna stalk, there is essentially no intrusion into the housing of the diplexer circuitry which would require enlargement of the housing. Also, the outer shape of the diplexer is cylindrical with outer diameter only slightly larger than the antenna stalk diameter. This relatively small increase in the diameter avoids inconvenience to a person using the radiotelephone.

The diplexer has two branches, each of which includes a filter for passing signals in the transmission and reception bands of a specific one of the transceivers. Thus, in the case wherein the radiotelephone is to be provided with a transceiver operative at 1900 MHz and a second transceiver operative at a frequency of 850 MHz, the diplexer has two branches. However, the theory of the invention applies also to diplexers for use in other electronic equipment wherein it may be necessary to employ three or more branches, each having a frequency passband specific to a specific portion of the communication spectrum to be employed by circuitry of the electronic equipment.

The construction of the diplexer is best illustrated for the case of a radiotelephone having the foregoing two receivers, and wherein the antenna has a rod shape. The antenna element is understood to have a conductive metal or metalized body. The diplexer is constructed of a series of concentric dielectric cylinders wherein each cylinder supports a portion of the electrical circuitry of the diplexer. For example, in the case of a relatively simple LC (inductor-capacitor) high-pass filter for a first of the diplexer branches and an LC low-pass filter for the second branch, the inductor of the first branch is formed of electrically conductive material wound about an inner one of the dielectric cylinders while the inductor of the second branch is formed of electrically conductive material wound about an outer one of the dielectric cylinders.

A central one of the dielectric cylinders is disposed between the inner and the outer dielectric cylinders. An encircling metallic skin placed on the central dielectric cylinder serves as a grounded plate of one of the capacitors which forms a part of the low-pass filter of the second branch. A further metallic skin about the outer dielectric cylinder serves as the second plate of the capacitor of the second branch. A further metallic skin about the outer dielectric cylinder serves as a plate of the capacitor of the first branch. The outer surface of the antenna stalk serves as the second plate of the capacitor of the first branch. In the event that more complex filters, and/or more branches are to be employed in the diplexer, then additional cylinders encircling the stalk of the antenna may be employed for supporting the additional electrical components. Thereby, there is attained the desired cylindrical construction of the diplexer wherein all components of the diplexer are found within a cylindrical region of space encircling the stalk of the antenna, and wherein the diameter of the cylindrical space is sufficiently small so as to avoid any inconvenience to a person utilizing the electronic equipment.

BRIEF DESCRIPTION OF THE DRAWING

The aforementioned aspects and other features of the invention are explained in the following description, taken in connection with the accompanying drawing figures wherein:

FIG. 1 is a block diagram of a radiotelephone including the diplexer of the invention;

FIG. 2 is a stylized perspective view of a radiotelephone having a rod-shaped antenna with the diplexer of the invention encircling the antenna;

FIG. 3 shows a detail in the construction of the antenna to provide for plural bands of operation of the antenna;

Figure 4:
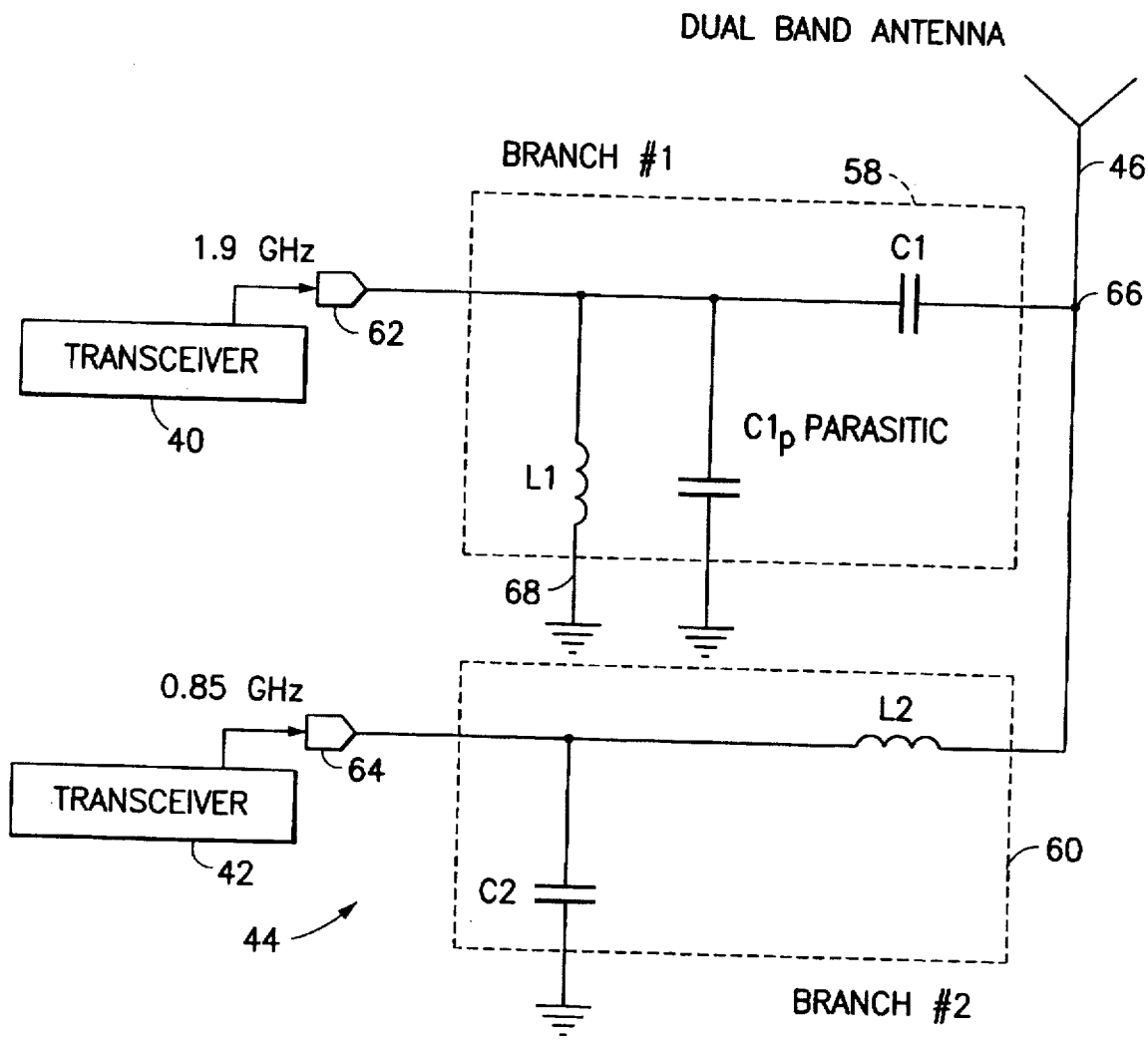
FIG. 4 is a schematic drawing of the diplexer of the invention for the case wherein two branches are to be employed.

Identically labeled elements appearing in different ones of the figures refer to the same element but may not be referenced in the description for all figures.

DETAILED DESCRIPTION OF THE INVENTION

FIG. 1 shows a radiotelephone 20 comprising a microphone 22, a speaker 24, an analog-to-digital converter 26, a digital-to-analog converter 28, and an encoder/decoder unit 30. The encoder/decoder unit 30 connects to the microphone via the converter 26 and connects to the speaker 24 via the converter 28. The encoder/decoder unit 30 is controlled by a microprocessor 32. Data is inputted to the microprocessor 32 via a keyboard 34, and information outputted by the microprocessor 32 is presented on a display 36 for a user of the radiotelephone 20. The RF portion 38 of the radiotelephone 20 comprises two transceivers 40 and 42, and a diplexer 44 which interconnects the two transceivers 40 and 42 to an antenna 46. The transceiver 40 provides up-link and down-link communication bands, and operates at carrier frequencies having values of approximately 1.9 GHz (gigahertz). The transceiver 42 provides up-link and down-link communication bands, and operates at carrier frequencies having values of approximately 0.85 GHz. A selector switch 48 interconnects the coder/decoder unit 30 with each of the transceivers 40 and 42. The switch 48 enables a person operating the radiotelephone 20 to choose for communication via the higher frequency utilizing the transceiver 40, or at the lower frequency utilizing the transceiver 42. The encoder/decoder unit 30 is operative to process signals for both digital and analog forms of transmission. The digital and the analog signal formats are communicated respectively via the transceivers 40 and 42. It should be noted that in some embodiments of this invention both of the transceivers 40 and 42 may be digital transceivers.

FIG. 2 shows the radiotelephone 20 constructed with a housing 50 which encloses the electrical components shown in FIG. 1. The display 36 and the keyboard 34 are on a surface of the housing 50 to be accessible to the person employing the radiotelephone 20. The antenna 46 has a rod shape and extends outwardly from the housing 50. In accordance with the invention, the diplexer 44 has a cylindrical construction which enables its emplacement upon the antenna 46 to provide for a compact configuration of the radiotelephone 20. Also included within the antenna 46 is a trap 52 which divides the antenna 46 into an inner portion 46A and an outer portion 46B. The trap 52 has the effect of increasing the electrical length of the antenna 46 for operation at the relatively low frequency of the transceiver 42, and for decreasing the electrical length of the antenna 46 for operation at the higher frequency of the transceiver 40.

FIG. 3 shows that the trap 52 is constructed of a parallel combination of a capacitor 54 and an inductor 56. The parallel circuit of the capacitor 54 and the inductor 56 resonate at the frequency at 1.9 GHz so as to prevent electrical signals in the communication channels of the transceiver 40 from entering the outer portion 46B of the antenna 46. At the signal frequency of 0.85 GHz employed in the communication channel of the transceiver 42, the circuitry of the trap 52 is essentially transparent so that the outer portion 46B is joined electrically to the inner section 46A. Thereby, the signals in the communication channels of the transceiver 42 respond to the full length of the antenna 46, while signals at the communication channels of the transceiver 40 respond only to the inner portion 46A of the antenna 46. The electrical length of the inner portion 46A of the antenna 46 is equal to one-quarter of a free-space wavelength at the frequency of 1.9 GHz, while the total length of the antenna 46 including both the inner portion 46A and the outer portion 46B is equal to a quarter wavelength of the free space radiation and a frequency of 0.85 GHz. Thereby, the antenna 46 is adapted to be optimized for transmission at each of the transceiver signals.

FIG. 4 shows circuitry of the diplexer 44. The diplexer 44 comprises a first branch 58 and a second branch 60. The first branch 58 has a terminal 62 connecting with the transceiver 40. The second branch 60 has a terminal 64 connecting with the transceiver 42. Each of the branches 58 and 60 connect with the antenna 46 at a common terminal 66. The first branch 58 comprises a first inductor L1 connecting between the terminal 62 and ground 68, and a first capacitor C1 connected between the terminal 62 and the terminal 66. The second branch 60 comprises a second capacitor C2 connected between the terminal 64 and ground and a second inductor L2 connected between the terminal 64 and the terminal 66. In the construction of the inductors L1 and L2, some parasitic capacitance may be present, this parasitic capacitance being of greater significance to the higher frequency signals of the first branch 58. Accordingly, in the first branch 58, the parasitic capacitance is represented by a capacitor c1p.

The first branch 58 functions as a high pass filter wherein the capacitor C1 acts essentially as a short circuit to the higher frequency signals of the transceiver 40 while the inductor L1 acts substantially as an open circuit to the signals of the transceiver 40. The lower frequency signals of the transceiver 42 are isolated by the first branch 58 from the transceiver 40 because the capacitor C1 acts substantially as an open circuit, and the indicator L1 acts substantially as a short circuit to ground any of the lower frequency signals which do pass through the capacitor C1.

The second branch 60 operates in the reverse fashion of the first branch 58 to provide the low pass frequency response. Thus, at the relatively low frequency of the transceiver 42, the capacitor C2 acts substantially as an open circuit and the inductor L2 acts substantially as a short circuit for passing signals between the antenna 46 and the transceiver 42. The filter of the second branch 60 isolates the transceiver 40 from the transceiver 42 because the inductor L2 acts substantially as an open circuit to the high frequency signals of the transceiver 40, and the capacitor C2 acts substantially as a short circuit for shorting out such high frequency signals as may pass through the inductor L2. It should be noted that the branches 58 and 60 also function as matching circuits between the antenna and the transceivers.

Figure 5:
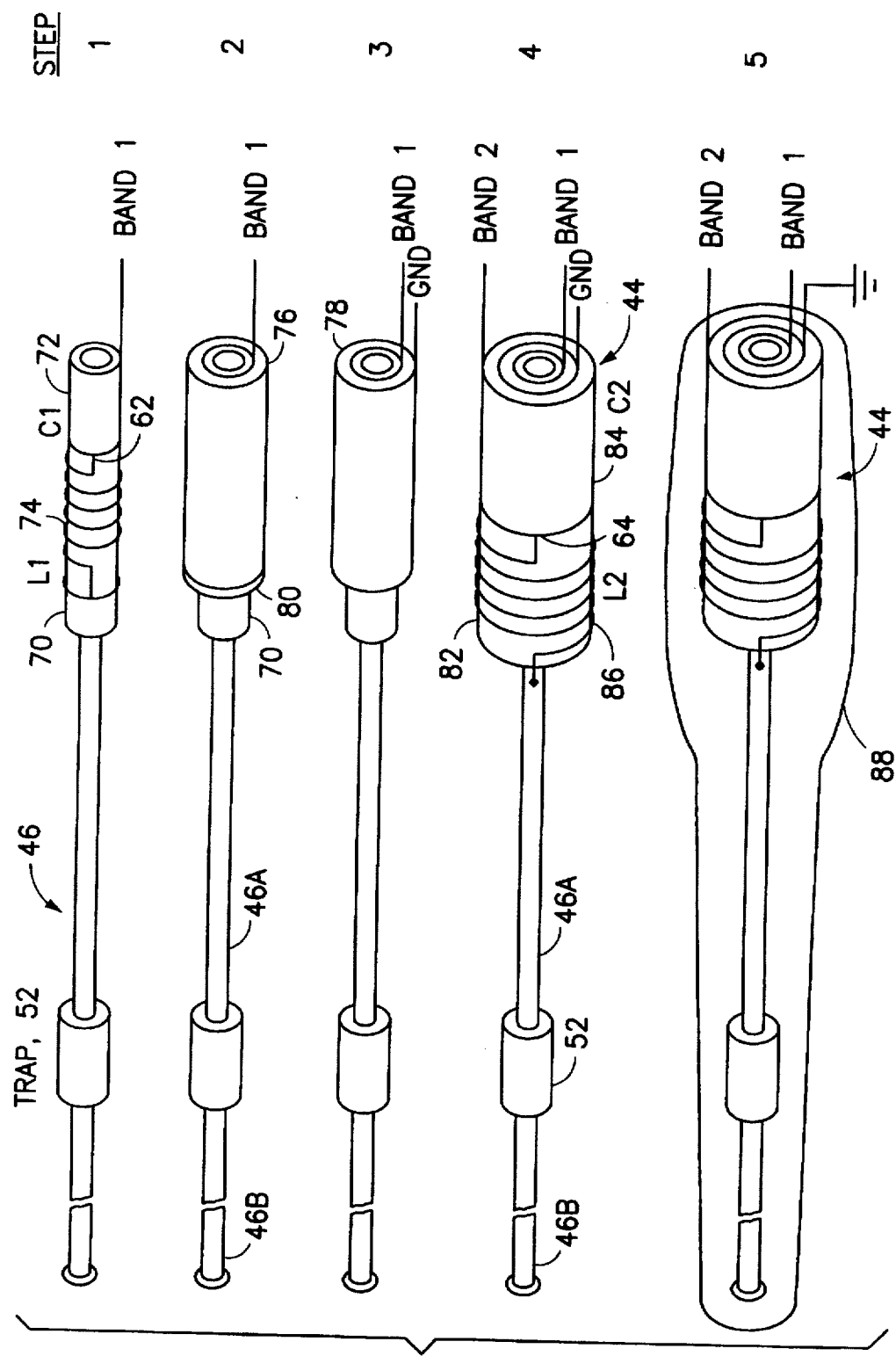
FIG. 5 shows five steps in the construction of the diplexer of FIG. 4 to develop an arrangement of coaxial cylindrical portions constituting the diplexer.

FIG. 5 shows steps in the construction of the diplexer 44 about the inner portion 46A of the antenna 46. The antenna 46 is constructed, by way of example, of a metallic, electrically-conducting rod, wherein both the inner portion 46A and the outer portion 46B are constructed from segments of the rod. Alternatively, if desired, the portions 46A and 46B of the antenna 46 may be constructed of a rod of other semi-rigid material, such as fibrous glass, and covered with an electrically conductive skin, such as a layer of metal. In the first step of the construction of the diplexer 44, a dielectric sleeve 70 is placed on the end of the rod of the antenna inner portion 46A. The sleeves 70 may be fabricated, by way of example, of a dielectric material such as glass, alumina, or Teflon®. One plate of the capacitor C1 is formed as layer 72 of electrically conductive material, such as copper by way of example, which is disposed on the sleeve 70 and encircles the sleeve 70 in the manner of a band. The inductor L1 is formed of an elongated strip of electrically conductive material, such as a metal film by way of example, the electrically conductive material being shown as a conductive strip 74 which is wound in spiral fashion about the sleeve 70. The connection between the inductor L1 and the capacitor C1 at terminal 62 (as shown previously in FIG. 4) is indicated also in FIG. 5. The layer 72 is indicated also in FIG. 5 as "BAND 1".

The construction process continues with the emplacement of a second dielectric sleeve 76 to encircle the first dielectric sleeve 70 and being in contact with the layer 72 and the strip 74. Thereupon, a further layer 78 of electrically conductive material is placed upon the outer surface of the sleeve 76, and encircles the sleeve 76 in the manner of a band. The layer 78 connects with an end of the inductor L1 via a ring 80 of metal which is in contact with the end of the inductor L1 and extends radially outward from the axis of the antenna 46 along a base of the second dielectric sleeve 76 to contact the layer 78. The outer surface of the rod of the antenna 46 serves as one plate of the capacitor C1, and the layer 72 serves as a second plate of the capacitor C1. The layer 78 serves as a ground terminal for grounding the inductor L1. As noted in FIG. 4, one plate of the capacitor C1 is connected to the antenna 46 at terminal 66, this connection being accomplished in FIG. 5 by virtue of the fact that the outer surface of the antenna 46 serves as a plate of the capacitor C1.

The construction of the diplexer 44 continues further by placing a third dielectric sleeve 82 upon the ground layer 78, the sleeve 82 being in contact with the layer 78 and coaxial to the antenna 46. The three sleeves 70, 76, and 82 may be fabricated of the same dielectric material or of differing dielectric materials. A further layer 84 of electrically conductive material is placed on the outer surface of the outer sleeve 82, the layer 84 encircling and contacting the sleeve 82 in the manner of a band. The layer 84 is indicated also in FIG. 5 by "BAND 2". The layer 84, in combination with the ground layer 78 and the outer sleeve 82 constitute the capacitor C2. An electrically conductive strip 86, of copper, by way of example, is wound about the outer surface of the sleeve 82 to form the inductor L2. As has been shown in FIG. 4, the inductor L2 joins with the capacitor 82 at the terminal 64, the terminal 64 being indicated also in FIG. 5. The opposite end of the inductor L2 connects with the antenna 46, as shown in both FIGS. 4 and 5. The grounding of one plate of the capacitor C2, as shown in FIG. 4, is accomplished by the grounding of the layer 78, as shown in FIG. 5.

Thus, the diplexer 44 comprises an inner sleeve 70, a central sleeve 76, and an outer sleeve 82. The four plates of the capacitors C1 and C2 are formed by the outer surface of the rod 46, the layer 72, the layer 78, and the outer layer 84. The entire assembly of the antenna 46 and the diplexer 44 is enclosed within a jacket 88 of electrically insulating material for protecting the assembly from the environment. As an additional feature of this construction of the diplexer 44, the ground layer 78 serves also to reduce mutual coupling between the inductors L1 and L2 thereby to insure independent operation of the filtering functions of the two branches 58 and 60 of the diplexer 44.

Figure 6:
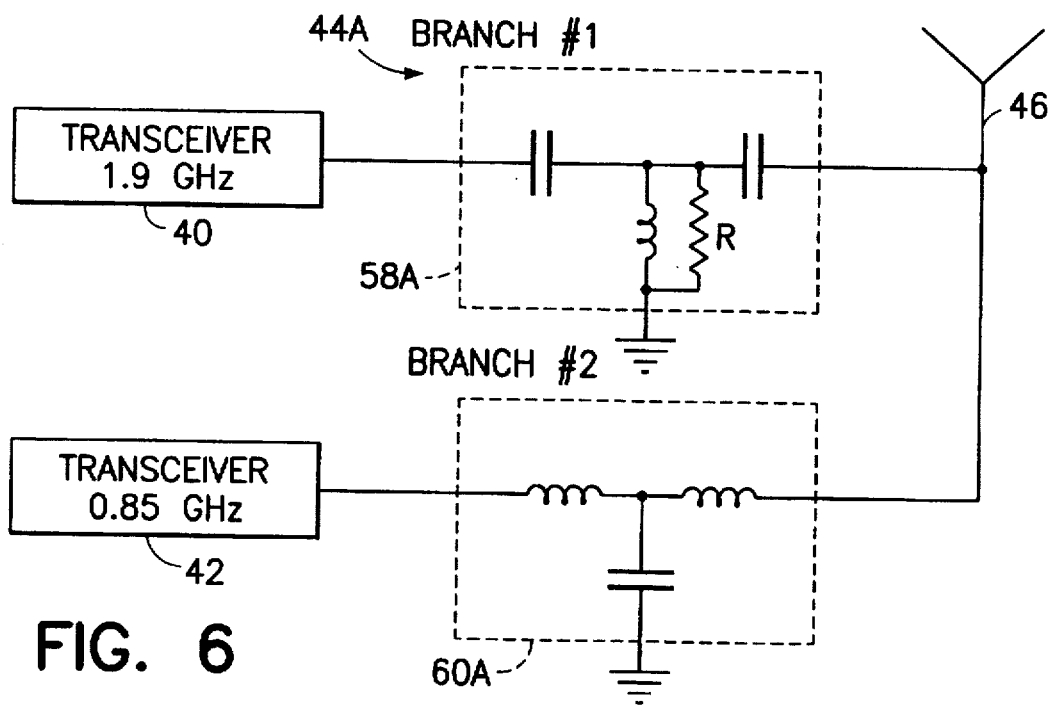
FIG. 6 shows an alternative embodiment of the diplexer wherein each branch includes a filter having three components.

FIG. 6 shows a schematic diagram of a diplexer 44A which is an alternative embodiment to the diplexer 44 of FIG. 4. In FIG. 6, each of the two branches of the diplexer 44A include three components. Thus, the first branch which couples the higher frequency signals between the transceiver 40 and the antenna 46 has a high pass filter comprising two capacitors connected in series, with a junction between the capacitors being grounded by an inductor. The second branch which couples the lower frequency signals between the transceiver 42 and the antenna 46 comprises two inductors connected in series, with a junction between the inductors being grounded via a capacitor. In the construction of the preferred embodiment of the invention in accordance with the schematic diagram of FIG. 4, no resistive element is included in the circuitry. However, if desired, for purposes other than the implementation of the radiotelephone, a resistor might be added into the first branch, by way of example. Such a resistor R is shown in phantom in FIG. 6, the resistor R being in parallel with the inductor of the first branch. The resistor R may be constructed in accordance with the principles of FIG. 5 by deposition of a strip of resistive material on one of the sleeves. In the event that the resistance is to be in series with the inductor, this would be attained by constructing the inductor of resistive material thereby providing for both the inductance and the resistance.

A computer simulation has shown that the insertion loss to the antenna in both frequency bands of interest (e.g., 1.9 GHz and 0.85 GHz) is less than 0.5 dB.

Figure 7:
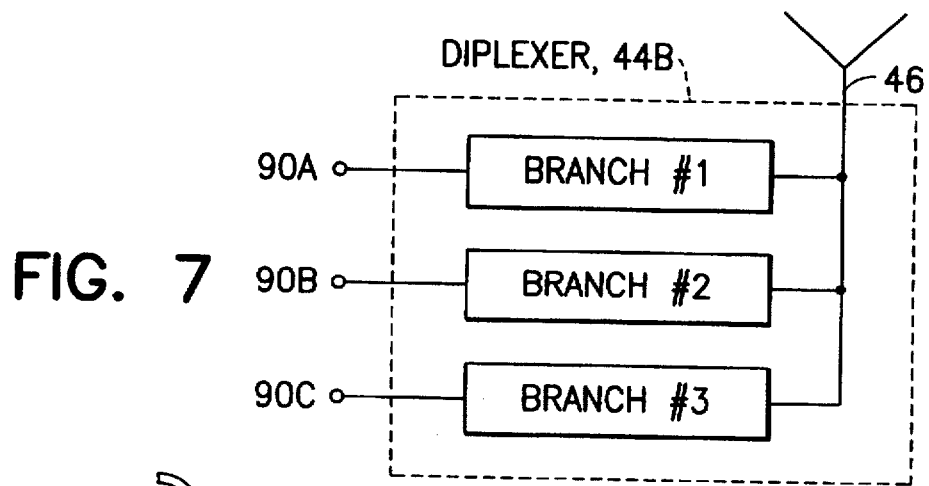
FIG. 7 shows an alternative embodiment of the diplexer wherein the diplexer has three branches connected to a common antenna.

In FIG. 7, there is a block diagram of a diplexer 44B which is a further embodiment of the diplexer 44 of FIG. 4. In FIG. 7, the diplexer 44B has three branches for connection with three electric circuits by input terminals 90A, 90B, and 90C. The three branches comprise a low pass, a high pass, and a bandpass filter, the respective filters being tuned to different portions of the electromagnetic spectrum. Thereby, the single antenna 46 can communicate signals at three different frequency bands with three separate electronic circuits connected to the terminals 90A–90C.

Figure 8:
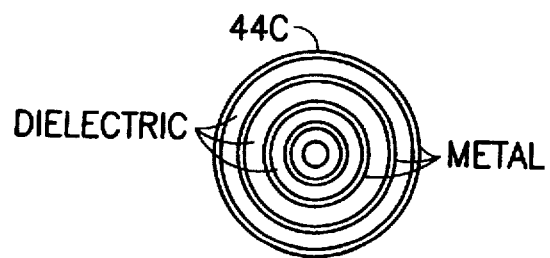
FIG. 8 is a stylized end view of a further embodiment of the diplexer wherein numerous metal rings are spaced apart by numerous dielectric sleeves.

FIG. 8 shows how the diplexers 44A and 44B of FIGS. 6 and 7 can be constructed. This construction employs additional ones of the dielectric sleeves and additional ones of the metallic rings, all of these sleeves and rings being coaxial. Connections between various ones of the capacitors and inductors can be made in the manner of the connection of ring 80 (FIG. 5), such connection being omitted for simplification of the presentation shown in FIG. 8. The metal regions in FIG. 8 may be capacitive plates or inductors or both, as has been disclosed in FIG. 5. The additional ones of the sleeves and the metal layers enables construction of more complex diplexer circuits such as are shown in FIGS. 6 and 7. The configuration of the component parts of the assembly of FIG. 8 may be viewed as a laminate of dielectric and electrically conductive materials surrounding the stalk or stem of the antenna. The innermost sleeve may be regarded as providing a central passage for receiving the stalk of the antenna whereby the diplexer may be regarded as being mountable upon any antenna having the requisite stalk diameter.

Figure 9:
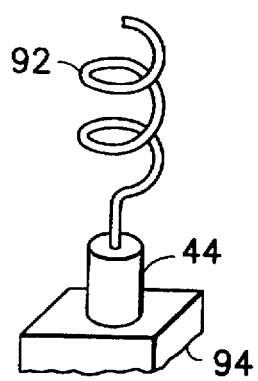
FIG. 9 is a stylized view of the implementation of the diplexer of the invention with a helically shaped antenna.

FIG. 9 shows a further embodiment of the assembly of the antenna plus diplexer wherein the diplexer 44 is mounted about a rod-shaped section antenna element, the rod-shaped section being a stalk for supporting a helical antenna 92. The helical antenna 92 stands upon a base 94.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A diplexer for coupling plural electronic circuits to a common antenna, comprising:

a first diplexer branch having a first filter comprising a first capacitor and a first inductor;

a second diplexer branch having a second filter comprising a second capacitor and a second inductor;

wherein said first and said second diplexer branches couple respectively a first and a second of said circuits to said antenna, at least a portion of said antenna being configured in the shape of a rod;

each of said capacitors comprises an inner electrically conductive band and an outer electrically conductive band, both of said bands encircling said antenna portion and being electrically insulated therefrom, said outer electrically conductive band being spaced apart from said inner electrically conductive band and being dielectrically coupled thereto; and each of said inductors comprises a length of electrically conductive material encircling said antenna portion, said inductors being electrically insulated from each other and from said antenna portion.

2. A diplexer according to claim 1 further comprising:

a plurality of dielectric sleeves coaxial to and encircling said antenna portion, said plurality of sleeves including an inner sleeve and an outer sleeve;

an inner band of a first of said capacitors is located on an inner one of said sleeves, and an outer band of said first capacitor is located on an outer one of said sleeves facing the inner band of said first capacitor; and in each of said inductors, the electrically conductive material is wound on one of said sleeves.

3. A diplexer for coupling plural electronic circuits to a common antenna, comprising:

a first diplexer branch having a first filter comprising a first capacitor and a first inductor;

a second diplexer branch having a second filter comprising a second capacitor and a second inductor;

wherein said first and said second diplexer branches couple respectively a first and a second of said circuits to said antenna, at least a portion of said antenna being configured in the shape of a rod;

said diplexer further comprises a cylindrical laminate of dielectric sleeves and electrically conductive layers, said electrically conductive layers being interposed between respective ones of said sleeves, said laminate encircling said antenna portion; and individual ones of said conductive layers serve as plates of said capacitors.

4. A diplexer according to claim 3 wherein each of a plurality of said layers includes an elongated electrically conductive strip to serve as one of said inductors.

5. A diplexer according to claim 4 further comprising an electrically conductive ring extending radially outward across a base of one of said sleeves to interconnect one of said plates with one of said conductive strips, thereby to accomplish a connection between one of said capacitors and one of said inductors.

6. A diplexer according to claim 4 wherein, in one of said layers, said conductive strip of said inductor connects with one of said plates to accomplish a connection between one of said capacitors and one of said inductors.

7. A diplexer configured for mounting on an antenna extending from a housing of electronic circuitry, comprising:

a plurality of filters comprising a plurality of energy storage elements wherein an individual one of said energy storage elements is an inductor or a capacitor, each of said filters having at least one of said storage elements;

a laminate of dielectric layers interposed between electrically conductive layers, said laminate having a central passage for receiving a rod-shaped portion of the antenna;

wherein, in the event that said individual one of said storage elements is an inductor, a portion of one of said conductive layers is configured as an elongated conductive strip to serve as said inductor; and in the event that said individual one of said storage elements is a capacitor, two of said conductive layers disposed on first and second opposed surfaces of one of said dielectric layers serve as plates of said capacitor.

8. A diplexer according to claim 7 wherein said laminate has cylindrical symmetry about said central passage.

9. A diplexer according to claim 8 wherein said diplexer comprises both an inductor and a capacitor, and each of the plates of said individual capacitor have a cylindrical shape.

10. A diplexer according to claim 9 further comprising an electrically conductive ring extending radially outward across a base of one of said dielectric layers to interconnect one of said plates with said inductor to accomplish a connection between one of said capacitors and said inductor.

11. A diplexer according to claim 9 wherein said elongated conductive strip of said inductor connects with one of said plates of one of said capacitors to accomplish a connection between said one capacitor and said inductors.

12. A diplexer according to claim 9 wherein the diplexer comprises two inductors, and one of said electrically conductive layers extends between said two inductors to shield the two inductors from each other.

* * * * *